(12) United States Patent
Bessagnet et al.

(10) Patent No.: US 7,942,005 B2
(45) Date of Patent: May 17, 2011

(54) COMBUSTION CHAMBER IN A TURBOMACHINE

(75) Inventors: Florian Andre Francois Bessagnet, Antony (FR); Patrice Andre Commaret, Rubelles (FR); Mario Cesar De Sousa, Cesson (FR); Didier Hippolyte Hernandez, Quiers (FR)

(73) Assignee: SNECMA, Paris (FR)

( * ) Notice: Subject to any disclaimer, the term of this patent is extended or adjusted under 35 U.S.C. 154(b) by 971 days.

(21) Appl. No.: 11/670,519

(22) Filed: Feb. 2, 2007

(65) Prior Publication Data

US 2007/0193248 A1 Aug. 23, 2007

(30) Foreign Application Priority Data

Feb. 8, 2006 (FR) ...................................... 06 01097

(51) Int. Cl.
*F02C 1/00* (2006.01)
*F02G 3/00* (2006.01)
(52) U.S. Cl. ................. 60/752; 60/754; 60/755; 60/756
(58) Field of Classification Search ..................... 60/752, 60/754–756
See application file for complete search history.

(56) References Cited

U.S. PATENT DOCUMENTS

| 5,138,841 | A | * | 8/1992 | Skidmore | ........................ | 60/752 |
| 5,222,357 | A | * | 6/1993 | Eddy et al. | ........................ | 60/800 |
| 6,260,359 | B1 | * | 7/2001 | Monty et al. | ........................ | 60/752 |
| 2002/0017101 | A1 | | 2/2002 | Schilling et al. | | |
| 2002/0184893 | A1 | | 12/2002 | Farmer et al. | | |

FOREIGN PATENT DOCUMENTS

| DE | 29 32 318 A1 | 2/1981 |
| EP | 0 552 477 A1 | 7/1993 |
| EP | 1 329 669 A2 | 7/2003 |
| FR | 2 144 731 | 2/1973 |
| GB | 2 287 310 A | 9/1995 |

OTHER PUBLICATIONS

U.S. Appl. No. 12/190,105, filed Aug. 12, 2008, Commaret, et al.

* cited by examiner

*Primary Examiner* — Michael Cuff
*Assistant Examiner* — Craig Kim
(74) *Attorney, Agent, or Firm* — Oblon, Spivak, McClelland, Maier & Neustadt, L.L.P.

(57) ABSTRACT

A turbomachine combustion chamber has primary and dilution air inlet orifices formed by die stamping to have edges that project into the inside of the combustion chamber, and stress relaxation and/or reduction means in the edges or in the vicinity of the edges of said orifices, said means comprising, for each orifice, one, two, or three slots formed in the edge or around a fraction of the edge of said orifice.

16 Claims, 4 Drawing Sheets

COMBUSTION CHAMBER IN A TURBOMACHINE

The present invention relates to an annular combustion chamber for a turbomachine such as an aircraft turbojet or turboprop.

BACKGROUND OF THE INVENTION

Such a combustion chamber has coaxial circularly-symmetrical walls extending one inside the other and interconnected at their upstream ends by an annular chamber end wall that has openings for feeding air and for fuel delivery means.

The inner and outer walls of the chamber include inlet openings and for primary air and dilution air, said openings having edges that project into the inside of the chamber in order to improve the penetration of air into the chamber and in order to guide said air into the very core of the combustion area of the chamber.

These air inlet orifices are usually circular in shape and made by die stamping, which has the effect of creating zones of high stress concentration in the edges of the orifices.

When the turbomachine is in operation, the inner and outer walls of the combustion chamber expand thermally and are subjected to high levels of vibration, thereby generating high stresses at the edges of the orifices, which can lead to cracks appearing in said edges, and can thus reduce the lifetime of the combustion chamber.

The combustion chamber walls may also include inclined multiperforations for passing cooling air that are formed at a distance from the projecting edges of the orifices and that do not provide adequate cooling in the immediate vicinity of said orifices. In these zones, the temperatures reached lead to local burning and corrosion of the metal, thereby leading to the appearance of cracks.

OBJECTS AND SUMMARY OF THE INVENTION

A particular object of the invention is to provide a solution to these problems that is simple, effective, and inexpensive.

To this end, the invention provides a combustion chamber for a turbomachine such as an aircraft turbojet or turbofan, the chamber comprising coaxial circularly-symmetrical walls extending one inside the other and connected together at their upstream ends by an annular chamber end wall, the inner and outer walls including primary air inlet orifices and dilution air inlet orifices formed by die stamping and having edges projecting into the inside of the chamber, the chamber including stress relaxation or reduction means in the edges or in the vicinity of the edges of at least some of said orifices, said stress relaxation or reduction means comprising, for each orifice, one, two, or three slots formed in the edge or around a portion of the edge of said orifice, each slot being connected at at least one of its ends to a crack propagation stop orifice.

The stress relaxation or reduction means of the invention avoid cracks forming in the edges of the primary and dilution air inlet orifices, and increase the lifetime of the chamber. These means are situated in the edge zones of the orifices that are the most stressed in operation, i.e. the zones where multiperforations cannot be formed and where cracks are likely to appear.

In a first embodiment of the invention, the stress relaxation or reduction means comprise slots extending from the edges of the air inlet orifices to stop orifices for stopping crack propagation. These stop orifices are circular and their diameter is greater than the width of the slots so as to reduce and spread out stress locally at the ends of the slots and prevent cracks from propagating at said ends.

These slots form interruptions in the zones subjected to stresses and impart relative flexibility to the edges of the orifices, thus enabling these zones to expand and deform freely relative to one another when the turbomachine is in operation. This avoids cracks forming and propagating in these zones and increases the lifetime of the chamber.

By way of example, the slots formed in the edge of an air inlet orifice may be one, two, or three in number and the size, the shape, and the orientation of each slot are determined so that the edge of the orifice presents sufficient flexibility, while retaining its main function of guiding air into the chamber.

The slots formed in the edge of an orifice are preferably symmetrical about a plane containing the axis of the orifice and the axis of the chamber. These slots may be distributed regularly about the axis of the orifice and they may be rectilinear or curved in shape.

In a variant embodiment of the invention, slots are formed at a distance from the edges of the orifices and around a fraction of said edges, each slot having a cylindrical orifice at each end that is of diameter greater than the width of the slot in order to prevent cracks propagating from the slot. These slots impart relative flexibility to the chamber wall around the orifices, thus enabling expansion and deformation to take place freely while the turbomachine is in operation.

Under such circumstances, a portion of the slot is preferably formed by a circular arc centered on the axis of the orifice. The end portions of said slot are advantageously directed outwards away from the axis of the orifice, i.e. into zones where stresses are smaller. These slots are preferably undulating in shape and present triple curvature, the middle curve extending around a portion of the orifice.

The slots and the crack propagation stop orifices of the chamber are preferably oriented parallel to microperforations formed in the chamber wall for cooling purposes. Air can penetrate into the chamber through these slots and through the stop orifices, and can contribute to cooling the chamber. The slots and/or the stop orifices may be formed by laser cutting, for example.

The air inlet orifices formed by stamping may be substantially oval in shape with a long axis lying in a plane parallel or perpendicular to the axis of the turbomachine, the long sides thereof being situated in the zones that are the most subject to cracking.

The invention also provides a turbomachine such as an aircraft turbojet or turboprop, the turbomachine including a combustion chamber as described above.

BRIEF DESCRIPTION OF THE DRAWINGS

The invention can be better understood and other characteristics, details, and advantages of the present invention appear more clearly on reading the following description made by way of non-limiting example with reference to the accompanying drawings, in which.

MORE DETAILED DESCRIPTION

Figure 1:
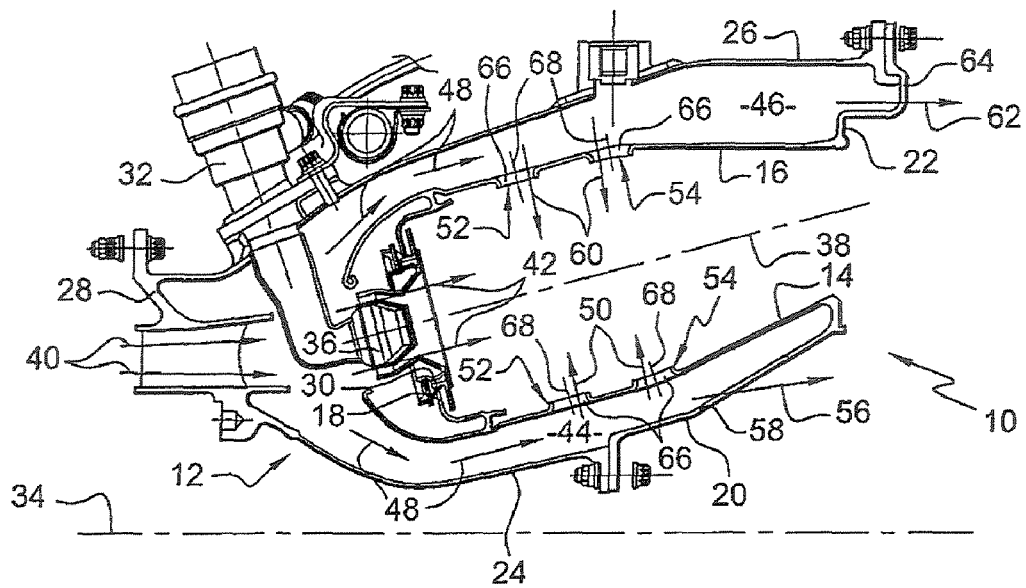
FIG. 1 is a diagrammatic half-view in axial section of a combustion chamber of a turbomachine.

In FIG. 1, a turbomachine combustion chamber 10 is disposed at the outlet of a diffuser 12, itself situated at the outlet from a compressor (not shown), and it comprises inner and outer circularly-symmetrical walls 14 and 16 connected upstream to an annular chamber end wall 18 and secured downstream via inner and outer annular flanges 20 and 22 respectively to an inner frustoconical web 24 of the diffuser and to one end of an outer casing 26 of the chamber, the upstream end of the casing 26 being connected to an outer frustoconical web 28 of the diffuser.

Figure 2:
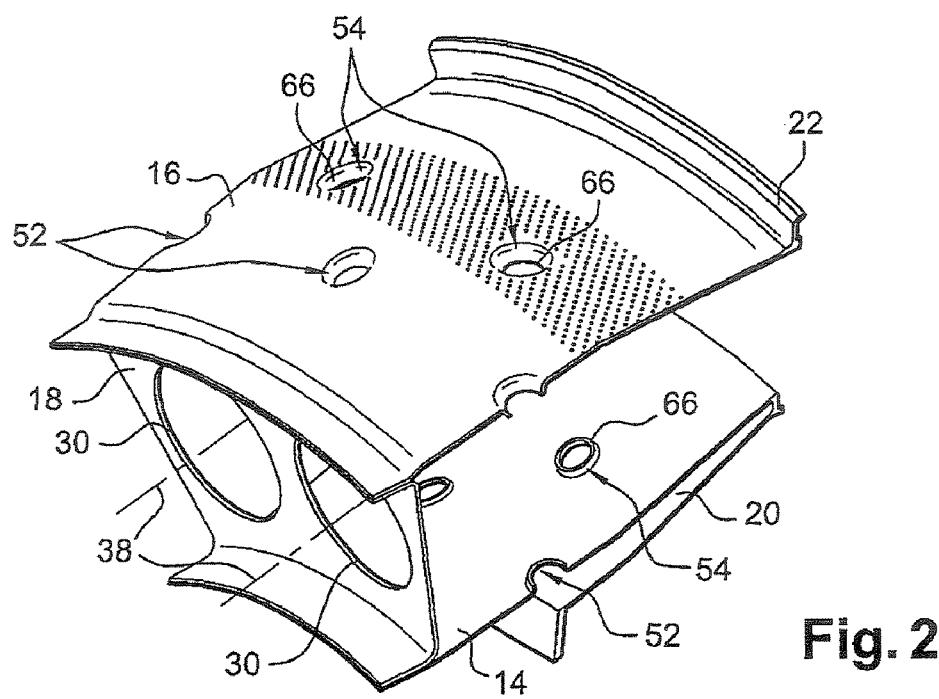
FIG. 2 is a fragmentary diagrammatic view in perspective of the walls of the chamber.

The annular chamber end wall 18 has openings 30 (FIGS. 1 and 2) through which there pass both air coming from the diffuser 12 and fuel delivered by injectors 32 secured to the outer casing 26 and regularly distributed around a circumference about the longitudinal axis 34 of the chamber. Each injector 32 has a fuel injection head 36 mounted in an opening 30 of the annular wall 18 and in alignment with the axis 38 of said opening 30.

A fraction of the air flow delivered by the compressor and leaving the diffuser 12 (arrows 40) passes through the opening 30 and feeds the combustion chamber 10 (arrows 42), while the remainder of the air flow feeds inner and outer annular channels 44 and 46 passing around the combustion chamber 10 (arrows 48).

The inner channel 44 is formed between the inner web 24 of the diffuser 12 and the inner wall 14 of the chamber, and the air that passes in this channel is shared between a flow 50 that penetrates into the chamber 10 via orifices 52, 54 in the inner wall 14, and a flow 56 that passes through holes 58 in the inner flange 20 of the chamber to cool components (not shown) situated downstream from the chamber.

The outer channel 46 is formed between the outer casing 26 and the outer wall 16 of the chamber, and the air that passes along this channel is shared between a flow 60 that penetrates into the chamber 10 via orifices 52, 54 in the outer wall 16, and a flow 62 that passes through holes 64 in the outer flange 22 to cool components downstream.

The orifices 52 are referred to as primary air inlet orifices and they are regularly distributed around circumferences both of the inner wall 14 and of the outer wall 16, said circumferences being centered on the axis 34 of the chamber, and the orifices 54, referred to as dilution air inlet orifices, are regularly distributed around circumferences both of the inner wall 14 and of the outer wall 16, said circumferences being centered on the axis 34 of the chamber and being downstream from the orifices 52.

Each orifice 52, 54 is of circular shape and is made by die stamping to have a flanged edge, i.e. the edge 66 has an annular flange projecting to the inside of the chamber 10. The axis 68 of each orifice 52, 54 is perpendicular to the wall 14, 16.

Because the orifices 52, 54 are made by stamping, high levels of residual stress are created in the vicinity of the edges 66 of the orifices, which stresses are in addition to stresses due to operation and can lead to the appearance of cracking at the edges.

Figure 6:
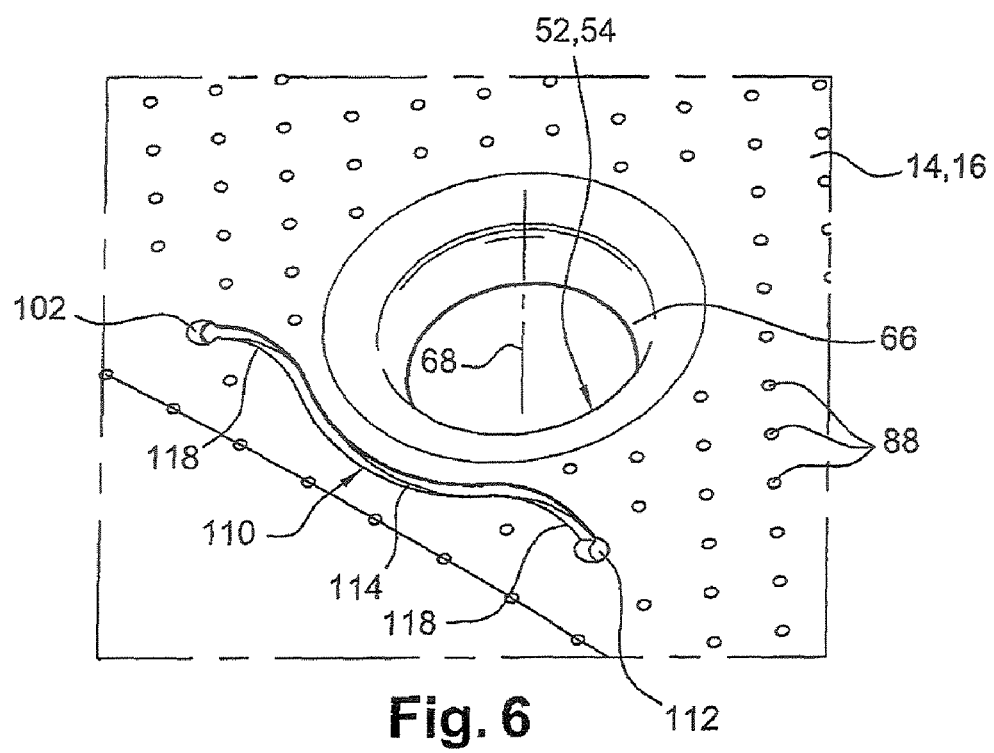
Figure 7:
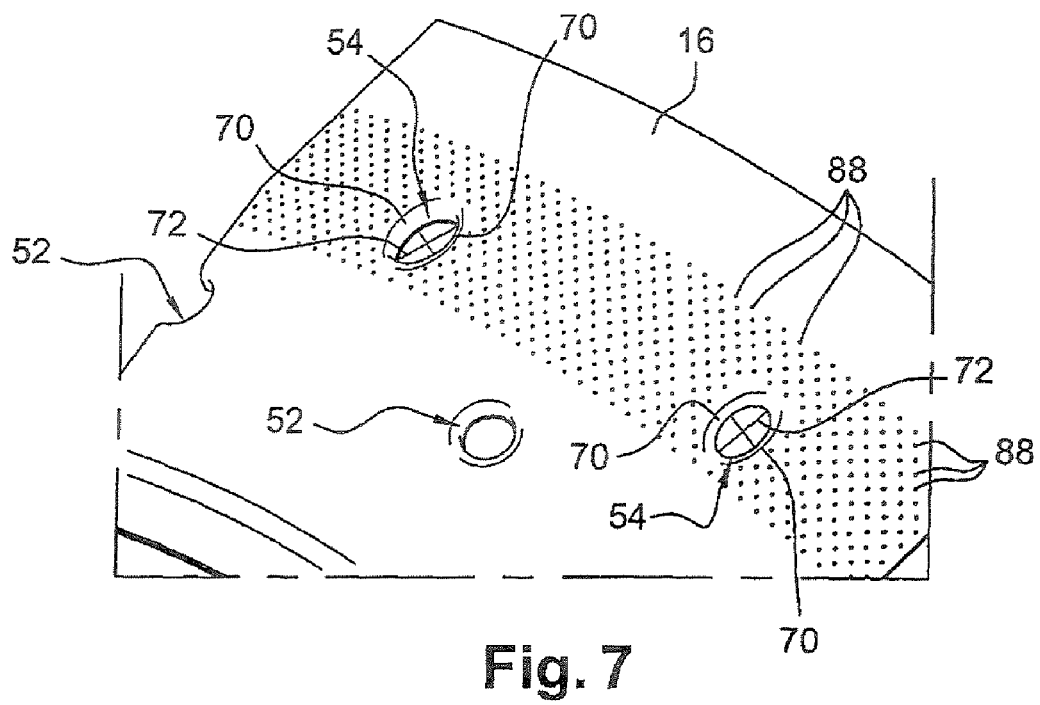
FIGS. 7 and 8 are views corresponding to FIG. 3 and showing other embodiments of the invention.
Figure 8:
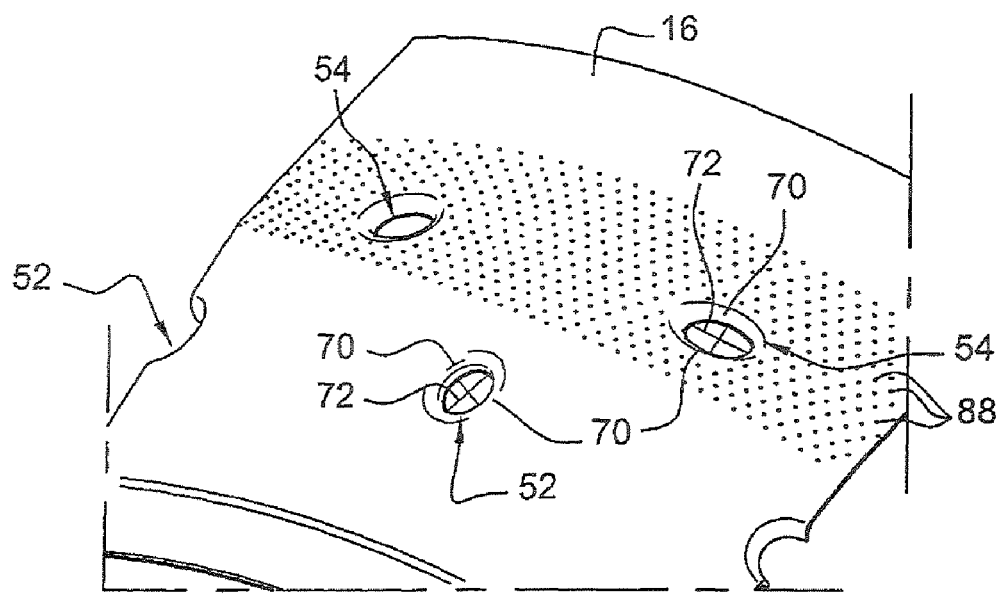

According to the invention, stress reduction or relaxation means are formed by slots 80, 90, 100, 110 formed in the edges 66 or around the edges 66 of the orifices (FIGS. 3 to 6), and/or by lengthening said orifices (FIGS. 7 and 8).

Figure 3:
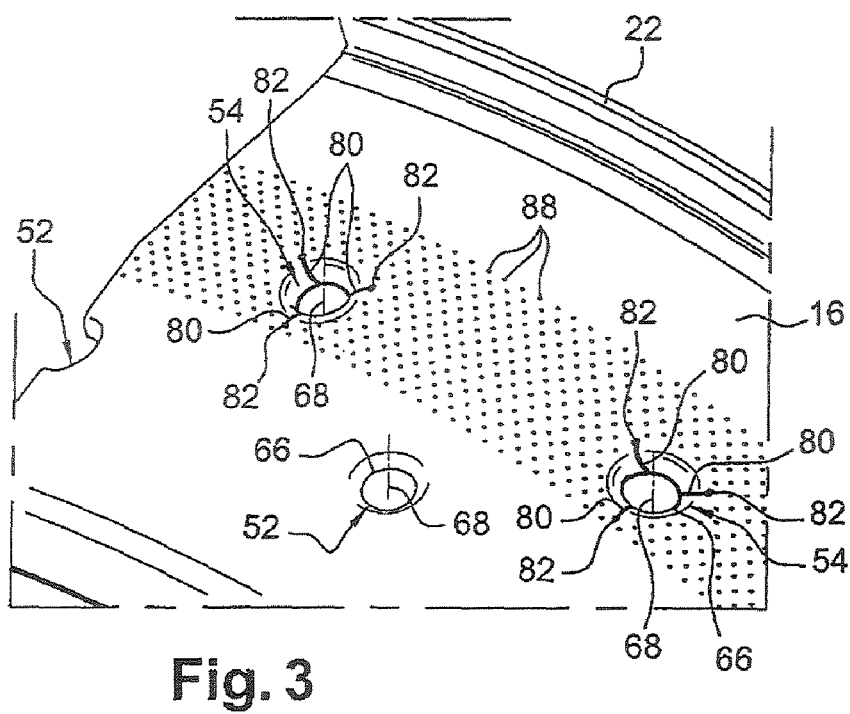
FIG. 3 is a diagrammatic view on a larger scale of a portion of the combustion chamber wall in an embodiment of the invention.
Figure 4:
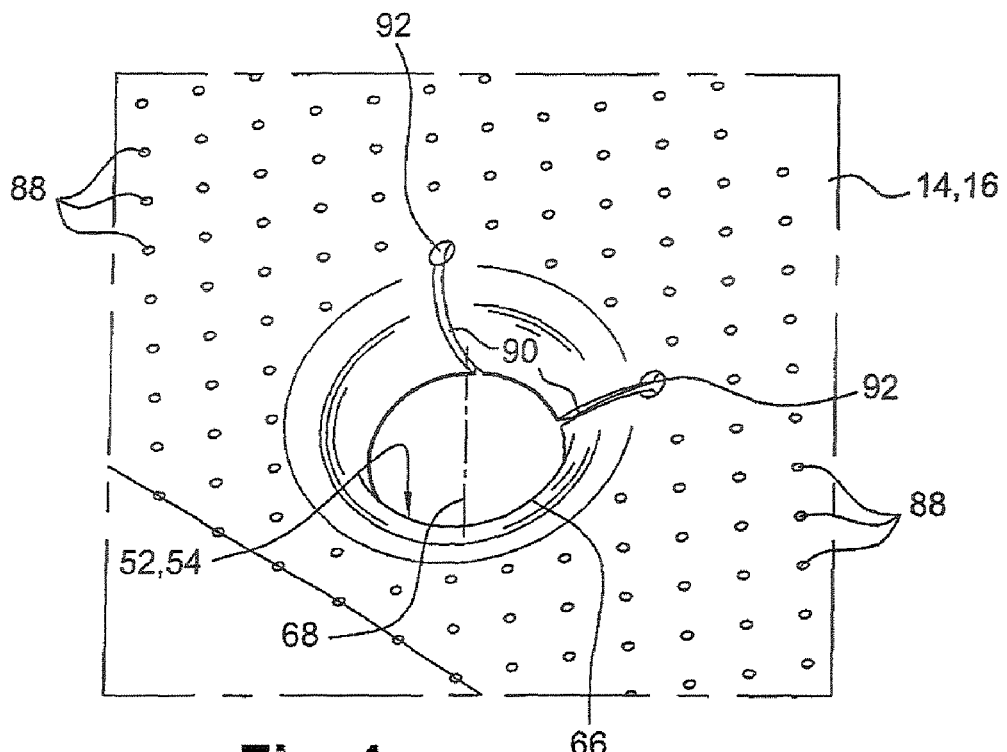
FIGS. 4 to 6 are views corresponding to FIG. 3 and on a larger scale, showing variants of the invention.
Figure 5:
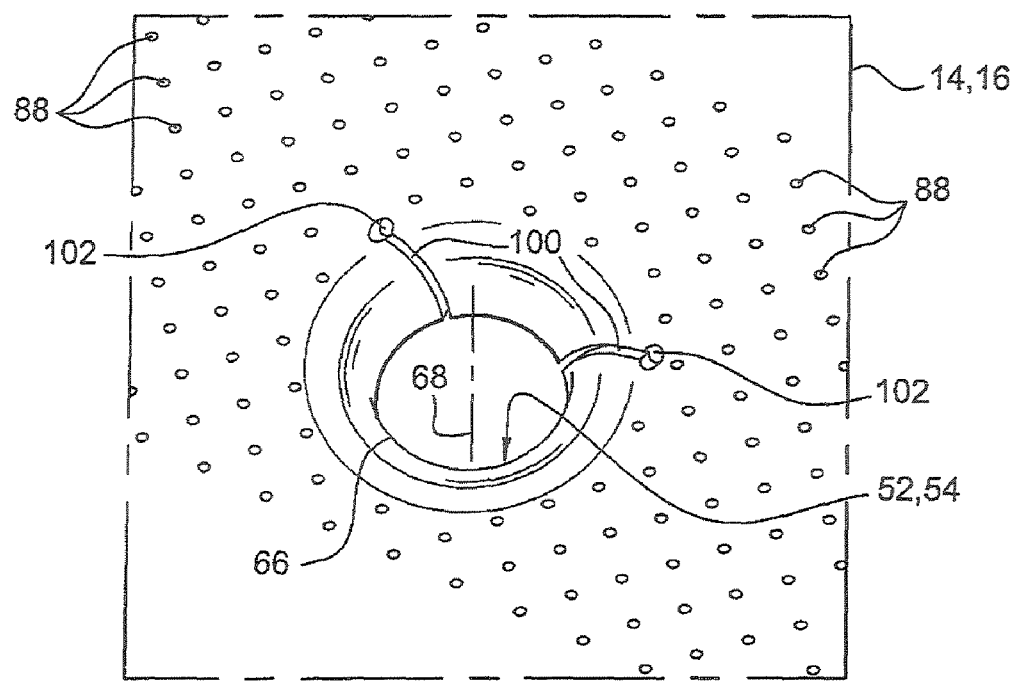

In the embodiments of FIGS. 3 to 5, these means comprise slots 80, 90, 100 formed in the flanges of the edges 66 of the circular orifices 52, 54, each slot terminating in a cylindrical orifice 82, 92, 102 of diameter greater than the width of the slot 80, 90, 100 and forming an orifice for stopping crack propagation.

In FIG. 3, each dilution air inlet orifice 54 has three rectilinear slots 80 extending substantially radially relative to the orifice 54 and regularly distributed around the axis 68 of said orifice.

One slot 80 extends upstream parallel to the axis of the chamber, and the other two slots 80 extend downstream. The edge 66 of each orifice 54 is subdivided into three identical portions which can expand and deform freely relative to one another when the turbomachine is in operation. The stop orifices 82 formed at the ends of the slots 80 are equidistant from the axis 68.

Slots 80 may also be formed in the edges of primary air inlet orifices 52 in the outer wall 16 and in the edges of the orifices 52, 54 in the inner wall 14.

In FIG. 4, the edge 66 of the orifice 52, 54 has two substantially rectilinear slots 90 that extend radially relative to the axis 68 of the orifice and that are symmetrical about a plane containing said axis 68 and the axis of the chamber. The stop orifices 92 formed at the ends of the slots 90 are equidistant from the axis 68 of the orifice.

In the example shown, the slots 90 extend downstream from the orifice and are at 90° to each other. They may be formed in the edges of the primary air inlet orifices 52 and/or in the edges of the dilution air inlet orifices 54 of the walls 14, 16 of the chamber.

In FIG. 5, the edge 66 of an orifice 52, 54 has two slots 100 that differ from the slots 90 of FIG. 4 in that they are curved in shape.

The slots 100 are curved through about 45°, and the portion of each slot 100 starting from the edge of the orifice extends substantially radially relative to the axis 68 of the orifice, while its other end is directed away from the other slot 100.

The slots 100 extend downstream from the orifice and their ends connected to the edge of the orifice are at about 90° to each other. They may be formed in the edges of the primary air inlet orifices 52 and/or in the edges of the dilution air inlet orifices 54 of the chamber walls.

In the variant of FIG. 6, the stress relaxation or reduction means comprise slots 110 of undulating shape formed around a fraction of the edge 66 of a circular orifice 52, 54, the slot having a stop orifice 112 at each of its ends that presents a diameter greater than the width of the slot 110.

In the example shown, a slot 110 presents triple curvature and is formed upstream from the edge 66 of an orifice 52, 54, the slot presenting a middle portion 114 constituting a circular arc centered on the axis 68 of the orifice, while the ends 118 of the slot 110 extend substantially radially outwards relative to the axis 68 of the orifice.

The portion of the chamber wall situated upstream from the edge 66 of the orifice thus acquires relative flexibility that enables it to expand and deform better in operation.

The walls 14, 16 of the chamber include microperforations 88 for passing cooling air, these microperforations being inclined, e.g. at about 60°, relative to a normal to the outer surface of the corresponding wall (FIGS. 3 to 6).

The slots 80, 90, 100, 110 and the stop orifices 82, 92, 102, 112 may be aligned with the microperforations 88 and they are situated at a distance from these microperforations 88 that is sufficient to avoid weakening the walls of the chamber 10 situated in the vicinity of the slots and the stop orifices. The slots and the stop orifices can thus also serve for cooling the chamber by air flowing through these orifices.

In an embodiment, the slots 80, 90, 100, 110 have width of less than about 1 millimeter (mm), e.g. equal to 0.5 mm, and the orifices 82, 92, 102, 112 then have a diameter lying in the range about 1 mm to about 2 mm.

In the variant embodiments of FIGS. 7 and 8, the orifices 52, 54 of the chamber are oval or elliptical in shape, and the stress relaxation or reduction means are formed by the long sides 70 of the edges of these orifices, situated on either side of the major axis 72 of the oval. These sides 70 have a large radius of curvature, thus enabling stresses to be better distributed and reduced in the edges of the orifices.

In FIG. 7, the primary air inlet orifices 52 are circular and the dilution air inlet orifices 54 are oval or elliptical in shape, with a major axis 72 extending parallel to the axis of the chamber so that the long sides 70 of the edges of the orifices situated on either side of the major axis prevent cracks forming in a direction extending transversely relative to the chamber axis.

In FIG. 8, the primary air inlet orifices 52 are identical to the orifices 54 of FIG. 7, and the dilution air inlet orifices 54 are oval or elliptical in shape, their major axes 72 extending transversely relative to the axis of the chamber, and the long sides 70 of the edges of the orifices preventing cracks forming in a direction parallel to the chamber axis.

Naturally, the invention is not limited to the embodiments described above and shown in the accompanying drawings. For example, the orifices 52, 54 of the chamber could be oval in shape and could also have slots 80, 90, 100, 110 formed in their edges or in the vicinity of their edges.

What is claimed is:

1. A combustion chamber for a turbomachine, the chamber comprising:
    an outer coaxial circularly-symmetrical wall;
    an inner coaxial circularly-symmetrical wall extending inside the outer wall;
    an annular chamber end wall which connects the inner wall and the outer wall at upstream ends of the inner and outer walls;
    primary air inlet orifices and dilution air inlet orifices disposed on the inner and outer walls which are formed by die stamping, the orifices including edges projecting into the inside of the chamber; and
    stress relaxation or reduction means in the edges or in the vicinity of the edges of at least some of said orifices, said stress relaxation or reduction means consisting, for each orifice, of one, two, or three slots formed in the edge or around a portion of the edge of said orifice, each slot being connected at least one of its ends to a crack propagation stop orifice,
    wherein the slots include inner walls and the stop orifices include inner walls, said inner walls of the slots and of the stop orifices being inclined relative to a normal to the inner or outer wall and are substantially parallel to inner walls of microperforations formed in said inner or outer wall for cooling the chamber by air flowing through the slots, the stop orifices and the microperforations.

2. A chamber according to claim 1, wherein the slots extend from the edges of the orifices to crack propagation stop orifices.

3. A chamber according to claim 2, wherein the slots formed in the edge of an orifice are symmetrical about a plane containing the axis of said orifice and the axis of the chamber.

4. A chamber according to claim 2, wherein the slots formed in the edge of an orifice are regularly distributed around the axis of the orifice.

5. A chamber according to claim 2, wherein the slots are rectilinear or curved in shape.

6. A chamber according to claim 1, wherein the slots are formed around a portion of the edges of the orifices and have a crack propagation stop orifice at each end.

7. A chamber according to claim 6, wherein a portion of each slot is of undulating shape and presents triple curvature.

8. A chamber according to claim 6, wherein a portion of each slot is formed by a circular arc centered on the axis of an orifice.

9. A chamber according to claim 8, wherein the end portions of the slot formed around the edge of an orifice are directed outwards away from the axis of said orifice.

10. A chamber according to claim 1, wherein the stop orifices are of a diameter lying in the range about 1 mm to about 2 mm.

11. A chamber according to claim 1, wherein the slots are of width less than about 1 mm.

12. A chamber according to claim 1, wherein the slots and/or the stop orifices are formed by laser cutting.

13. A chamber according to claim 1, wherein at least some of the air inlet orifices are oval in shape with a long axis situated in a plane parallel or perpendicular to the axis of the chamber.

14. A chamber according to claim 13, wherein the long sides of the orifices are situated in the zones most subject to cracking.

15. A turbomachine, such as an aircraft turbojet or turboprop, the turbomachine including a combustion chamber according to claim 1.

16. A chamber according to claim 1, wherein an axial position of some the microperforations formed in said inner or outer wall is the same as an axial position of the primary inlet orifices or the dilution air inlet orifices.

* * * * *